United States Patent [19]

Evans et al.

[11] Patent Number: 4,707,405

[45] Date of Patent: Nov. 17, 1987

[54] CYANAMIDE SALTS OF NON-LEAD METALS AS CORROSION INHIBITIVE PIGMENTS IN MIRROR BACK COATINGS

[75] Inventors: Elaine L. Evans, Pittsburgh, Pa.; James E. Graham, Marietta, Ga.; Alan B. Weissberg, Pittsburgh, Pa.

[73] Assignee: PPG Industries, Inc., Pittsburgh, Pa.

[21] Appl. No.: 815,615

[22] Filed: Jan. 2, 1985

[51] Int. Cl.⁴ .................. B32B 15/08; B32B 17/06
[52] U.S. Cl. ............................ 428/336; 252/387; 252/389.1; 427/402; 427/405; 427/409; 428/433; 428/457
[58] Field of Search .......... 428/457, 476.6, 433, 428/336; 524/193; 8/694; 149/21; 252/387, 389.1; 427/402, 409, 405

[56] References Cited

U.S. PATENT DOCUMENTS

| | | | |
|---|---|---|---|
| 3,878,038 | 4/1975 | Opderbeck et al. | 428/476.6 |
| 4,357,396 | 11/1982 | Grunewalder et al. | 428/457 X |
| 4,386,979 | 6/1983 | Jackson, Jr. | 149/21 |
| 4,394,129 | 7/1983 | Springer | 8/694 X |
| 4,536,527 | 8/1985 | Shearer et al. | 524/193 |

FOREIGN PATENT DOCUMENTS 1258659  6/1960  France ................... 428/457

OTHER PUBLICATIONS

S. Pawlikowski et al., Werkstoffe and Korrosion, vol. 10, Jan. 1959, pp. 498–499.
Chemisorption and Reactions on Metallic Films 2 (J. Anderson ed. 1971).
Corrosion of Chemically and Vacuum Deposited Silver Films on Glass by Wet Hydrochloric Acid Vapor, 13 Solar Energy Materials 419–432 (Park et al, 1986) at 430.

Primary Examiner—Thomas J. Herbert
Attorney, Agent, or Firm—Bruce H. Cottrell; Barbara J. Park

[57] ABSTRACT

Compositions of the invention comprise an organic film-forming resin and a cyanamide salt of a non-lead metal. The composition, when applied to a thin metallic film, inhibits degradation of the thin metallic film as compared to the composition without calcium cyanamide. Processes comprising the step of applying a composition of the invention to a thin metallic film and articles comprising a thin metallic film and a layer of a hardened composition of the invention are also disclosed.

9 Claims, No Drawings

CYANAMIDE SALTS OF NON-LEAD METALS AS CORROSION INHIBITIVE PIGMENTS IN MIRROR BACK COATINGS

BACKGROUND OF THE INVENTION

The invention relates to coating compositions that include an organic film forming resin and the cyanamide salt of a non-lead metal. The coating compositions are particularly useful for the protection of thin metallic films, such as mirrors.

A number of articles in widespread use comprise a thin metallic film or layer of silver or copper. Among the common articles on which such thin metallic films are employed are those of glass, such as mirrors. In such articles, the films are of varying thickness; for example, mirrors may have a metallic layer of 800 to 1500 Angstroms in total thickness.

Since these articles are intended for use over extended periods, the durability of the metallic film is an important consideration. These films, although varying in thickness, are always quite thin, and such thin films are subject to degradation due to oxidation and heat, and to attack by chlorides, sulfides, and other air contaminants to a greater degree than thicker films, or at least the deterioration and attack are more easily noticed at lower levels. Presumably because of the thinness of the film, even materials that are known to inhibit the corrosion and tarnishing of the metal are not sufficiently effective to prevent the degradation of such articles, and in some cases, such known "inhibitors" actually increase the rate of degradation of the film.

Because the visual properties of these articles are in most cases important, such deterioration and attack, even if slight, is highly undesirable as it is inevitably evidenced by discoloration and/or removal of the metallic film. For this reason, the exposed metallic surface of mirrors is usually coated with an organic coating composition which forms a protective layer. However, even this expedient is not always sufficient to prevent eventual attack and discoloration of the metallic film. These organic coating compositions are sufficiently permeable to various contaminants, such as chlorides, sulfides, and the like which cause and promote the deterioration to the metallic film that they do not provide adequate long term protection for the metallic films.

One common method of increasing the protection afforded to thin metallic films by such organic coating compositions is to include a leaded pigment in the compositions. Typical of such pigments are lead sulfate and lead carbonate.

An object of the present invention is to provide a composition that provides improved protection for thin metallic films and is lead-free.

SUMMARY OF THE INVENTION

Compositions of the invention comprise an organic film-forming resin and a cyanamide salt of a non-lead metal. The composition, when applied to a thin metallic film, inhibits degradation of the thin metallic film as compared to the composition without the cyanamide salt of a non-lead metal.

Processes of the invention comprise the step of applying to a thin metallic film a composition of the invention.

Articles of the invention comprise a thin metallic film and a layer of a hardened composition of the invention.

The compositions of the invention provides good protection for thin metallic films and inhibit the degradation of such films.

DETAILED DESCRIPTION OF THE INVENTION

The first component of the composition of the invention is an organic film-forming resin. Any organic film-forming resin can be used in connection with the composition of the invention. Preferably, the resin is compatible with a thin metallic film. Such an organic film-forming resin is compatible with a thin metallic film if, when applied to a thin metallic film, the resin does not promote the deterioration and discoloration of the thin metallic film. One reason that the organic film-forming resin might discolor and cause the film to deteriorate would be if the resin contained functional groups that are reactive with the metal. Suitable organic film-forming resins include alkyd resins, acrylic resins, acrylic-modified alkyd resins, urethane oils, vinyl halide polymers or copolymers, oleoresinous varnishes, nitrocellulose compositions, phenol-formaldehyde resin varnishes, epoxy resins and the like. Preferably, the organic film forming resin is curable by air drying or force drying.

The composition of the invention further includes a cyanamide salt of a non-lead metal. Preferably, the cyanamide salt is present in the composition at a level of from about 5 percent to about 40 percent, by weight, of the composition, based on pigment solids. It is advantageous for the cyanamide salt to have a particle size of less than about 35 microns. Preferably, the cyanamide salt is the cyanamide salt of a Group IIA or IIB metal, such as calcium, zinc or magnesium. The most preferred cyanamide salt is calcium cyanamide.

Other components that can be included in the compositions of the invention include catalysts, flow control agents, driers, anti-skinning agents and anti-settling agents.

Suitable catalysts include conventional catalysts. The particular catalysts used would depend on the vehicle system. Suitable flow control agents include silicones. Suitable driers include cobalt, manganese and zirconium based driers. Suitable anti-skinning agents include methyl ethyl ketoxime.

The process of the invention comprises the step of applying a composition of the invention to a thin metallic film. The thin metallic film to which the composition of the invention can be applied can be formed from any one of a number of metals. Preferably, the thin metallic film is either formed of silver or a composite of a layer of silver and a layer of copper. The thin metallic film is preferably up to about 1500 Angstroms thick, more preferably between about 800 Angstroms and about 1500 Angstroms thick.

Preferably, the thin metallic film is attached to a substrate. The preferred substrate is glass. In addition, various transparent plastic materials would make suitable substrates, an example of which is polycarbonate.

The thin metallic films which are coated in accordance with the invention may be prepared in several ways. For example, silver may be deposited from a reducing solution of a silver salt, such as an ammoniacal solution of silver nitrate containing dextrose or other reducing sugar. The silvering of glass is often carried out by first "sensitizing" the glass with an aqueous solution of a tin salt. Thin metallic copper films may be deposited by generally known methods including electrolytic deposition, galvanic deposition, or chemical deposition from solutions of copper salts. A preferred method for use on glass, ceramic, and similar siliceous surfaces is deposition by contacting a previously silvered surface with an aqueous alkaline solution containing a copper salt, a reducing agent, a tartrate salt, and a nickel or cobalt salt as described in U.S. Pat. No. 3,457,138. Other methods include the use of copper gluconate solution as described, for example, in U.S. Pat. No. 3,093,509.

The thin metallic films can be further protected by being treated with a mercapto and/or amino substituted thiadiazole or mercapto substituted triazole as described in U.S. Pat. No. 4,357,396. Another treatment method is described in U.S. Pat. No. 3,382,087, which relates to treatment of thin metallic films with an aminotriazole, an aminotetrazole, an aminoindazole or an indazole.

The composition of the invention may be applied to the thin metallic film by any method known in the art. Suitable methods include curtain coating, roll coating or spraying. The composition of the invention is preferably applied to the thin metallic film at a thickness of from about 0.5 mil to about 3 mils, more preferably, about 1.5 mils.

Articles of the invention include a thin metallic film and a hardened layer of the composition of the invention applied thereto. By hardened it is meant that the compositions can be cured if the resins are thermosetting or simply dried if the resins are thermoplastic. Preferably, the thin metallic film is attached to a substrate, the most preferred substrate being glass.

The following Examples set forth specific embodiments of the instant invention. However, the invention is not to be construed as being limited to these embodiments for there are, of course, numerous possible variations and modifications. All parts and percentages in the Examples as well as throughout the specification are by weight unless otherwise indicated.

EXAMPLE 1

(a) Three 8 inch by 12 inch float glass panels were cleaned with a felt block and an aqueous slurry of cerium oxide and rinsed thoroughly with deionized water, wiped with tissue and rinsed again with deionized water. The glass surfaces were then contacted with a 0.15 percent, by weight, aqueous stannous chloride solution and, after 5 seconds, rinsed thoroughly with deionized water. Next, the glass surfaces were sprayed for approximately 60 seconds with a reducing solution prepared by diluting 425 milliliters (440 grams) of a solution of 396 grams of dextrose, 4 liters of water, 10 milliliters of an aqueous 36 percent, by weight, formaldehyde solution and 6 milliliters of concentrated sulfuric acid with 4 liters of deionized water and an aqueous silver nitrate solution that is 0.4 percent, by weight, of silver nitrate. The solutions are intermixed as they are sprayed by means of an appropriate spray gun. The resulting silver film is approximately 700 Angstroms thick.

While the silver film was still wet, the silvered surfaces of the panels were coated with copper by spraying each of them for 20 seconds with two solutions intermixed as they are sprayed in equal volumes by means of an appropriate spray gun. The first solution was prepared by adding to one part, by volume, of a copper salt solution available as CU-1S from London Laboratories Limited, 3 parts, by volume, of deionized water. Then, while stirring, approximately ¼ part, by volume of a 29 percent aqueous ammonia solution was slowly added to the solution. The aqueous ammonia solution was added until the solution was a transparent light brown. The second solution was one part, by volume, of a sulfuric acid-based activator concentrate available from London Laboratories Limited as CU-3S and 3 parts, by volume, of deionized water. The films were thoroughly rinsed, blown dry, then flashed for one minute under infrared radiation. The copper film was approximately 250 Angstroms thick.

(b) Mirror back coatings were prepared by mixing the following components:

| Composition Component | 1A | 1B | Control |
|---|---|---|---|
| | Parts by weight | | |
| dehydrated castor oil alkyd[1] | 41.07 | 40.81 | 40.72 |
| phenolic resin[2] | 5.84 | 5.81 | 5.79 |
| propyleneglycolmonomethylether acetate[3] | 5.80 | 5.76 | 5.74 |
| methyl ethyl ketoxime[4] | 0.49 | 0.48 | 0.49 |
| dispersing agent[5] | 0.49 | 0.48 | 0.49 |
| magnesium silicate[6] | 35.18 | 39.33 | 40.71 |
| black tint[7] | 6.12 | 6.08 | 6.06 |

[1] 65.5 percent, by weight of a composition that is 18.34 percent, by weight, glycerine benzoate; 50.6 percent, by weight, glycerine phthalate; 28.49 percent, by weight, dehydrated castor oil and 2.57 percent, by weight, glycerine and 34.5 percent, by weight, of a solvent blend that is 14 percent, by weight, xylene and 86 percent, by weight, propyleneglycolmonomethylether acetate and having a Gardner-Holdt bubble tube viscosity at ambient temperature of Z2+, a color value of 3–4, a weight per gallon 9.2 and an acid value of 6.
[2] 55 percent, by weight, of a phenolic resin available as Ucar ® CK2400 phenolic resin from Union Carbide Corporation and 45 percent, by weight, of propyleneglycolmonomethylether acetate.
[3] Available as Dowanol ® PM acetate from Dow Chemical Co.
[4] Available as Exkin ® No. 2 from Nuodex, Inc.
[5] 70 percent, by weight of an oil modified polyester available as Nuosperse 657 from Tenneco Chemicals Corporation and 30 percent by weight of mineral spirits.
[6] Available as Mistron RCS-Talc from Cyprus Minerals.
[7] The black tint is a mixture of 49.78 parts, by weight, of propyleneglycolmonomethylether acetate, 31.25 parts, by weight, of the dehydrated castor oil alkyd of Example 1(a), 12.51 parts, by weight, of lampblack No. 6 available from General Carbon Company, 2.55 parts, by weight, of phthalo blue available from BASF Wyandotte Corporation, Inc., 2.30 parts, by weight, of xylene, 0.69 parts, by weight, of the dispersing agent of Example 1(a), 0.62 parts, by weight, of methylethylketoxime, and 0.30 parts, by weight, of mineral spirits.

and dispersing them to a particle size of 4½, 4½ and 5½, respectively, on a Hegman scale at a temperature of 133° F. Thereafter, 5.01 parts, by weight, of chemical grade calcium cyanamide available from Alfa Chemical Company was added to composition A and 1.25 parts, by weight, of the calcium cyanamide was added to composition B. Compositions A and B were then ground to a particle size of 0 on a Hegman scale at a temperature of 90° F.

Next, to each of the compositions was added 0.6133 milliliters of a blend of 21.03 grams of 12% cobalt catalyst, available under the trademark NuXtra ® from Tenneco, 42.07 grams of 9% manganese catalyst available under the trademark NuXtra ® from Tenneco and 42.09 grams of propyleneglycolmonomethylether acetate.

(c) The mirror back coatings of Example 1(b) were drawn down on the back surface of mirrored panels and exposed to infrared radiation at 230° F. A panel was prepared using coating 1A, one half of the panel having a dry film 1.1 mils the other half at a dry film thickness of 1.5 mils, respectively, a panel was prepared using coating 1B with the halves of the panel having dry film thickness of 1.0 and 1.6 mils, respectively, and a panel was prepared using the control coating with the halves of the panel having dry film thicknesses of 1.0 and 1.5 mils, respectively.

The panels were tested for response to exposure to salt spray. Coated mirrored panels were exposed to salt spray for 150 hours. The panels were then evaluated for black edge creep by taking the average of the black edge creep, in millimeters, on the three sides of the panel that had not been directly in contact with the rack during the salt spray exposure. Any spotting of the mirror was also noted. The results are shown in Table 1.

TABLE 1

| Test Coating | Sample | | | | | |
|---|---|---|---|---|---|---|
| | 1A | 1A | 1B | 1B | Control | Control |
| Dry film thickness of coating (mils) | 1.1 | 1.5 | 1.0 | 1.6 | 1.0 | 1.5 |
| Salt Spray | | | | | | |
| black edge creep (mm) | 3.5 | 0.9 | 7.5 | 4.0 | 12.5 | 11.0 |
| density of spotting | medium | medium | 1 spot | none | none | none |
| size of spots | very small | very small | very small | — | — | — |

The panels coated with coatings of the invention provide improved protection for the thin metallic films as best illustrated by the reduced black edge creep of coatings 1A and 1B after the salt spray test as compared to the control coating at both film thicknesses.

EXAMPLE 2

Mirror back coatings were prepared by mixing the following components:

| Composition Component | 2A | Control |
|---|---|---|
| | Parts by weight | |
| dehydrated castor oil alkyd[1] | 40.81 | 40.72 |
| phenolic resin[1] | 5.81 | 5.79 |
| propyleneglycolmonomethylether acetate[1] | 5.76 | 5.74 |
| methyl ethyl ketoxime[1] | 0.48 | 0.49 |
| dispersing agent[1] | 0.48 | 0.49 |
| magnesium silicate[1] | 39.33 | 40.71 |
| black tint[1] | 6.08 | 6.06 |

[1]As in Example 1(b).

and dispersing then to a particle size of 4½ and 5½ respectively, on a Hegman scale at a temperature of 133° F. Thereafter, 1.25 parts, by weight, of zinc cyanamide was added to composition 2A. Composition 2A was then ground to a particle size of between 5½ and 6 on a Hegman scale at a temperature of 93° F.

Next, to each of the compositions was added 0.6133 milliliters of a blend of 21.03 grams of 12% cobalt catalyst, available under the trademark NuXtra ® from Tenneco, 42.07 grams of 9% manganese catalyst available under the trademark NuXtra ® from Tenneco and 42.09 grams of propyleneglycolmonomethylether acetate.

(b) The mirror back coatings of Example 2(a) were drawn down on the back surface of mirrored panels and exposed to infrared radiation at 250° F. A panel was prepared using coating 2A, one half of the panel having a dry film 1.0 mils the other half at a dry film thickness of 1.7 mils, respectively, and a panel was prepared using the control coating with the halves of the panel having dry film thicknesses of 1.0 and 1.5 mils, respectively. The panels were then evaluated for exposure to salt spray as described in Example 1. The results are shown in Table 2.

TABLE 2

| Test Coating | Sample | | | |
|---|---|---|---|---|
| | 2A | 2A | Control | Control |
| Dry film thickness of coating (mils) | 1.0 | 1.7 | 1.0 | 1.5 |
| Salt Spray | | | | |
| black edge creep (mm) | 6.0 | <0.5 | 12.5 | 11.0 |
| density of spotting | medium | none | none | none |
| size of spots | small | — | — | — |

The panels coated with coatings of the invention provide improved protection for the thin metallic films as best illustrated by the reduced black edge creep of coatings 2A after the salt spray tests as compared to the control coating at both film thicknesses.

EXAMPLE 3

Mirror back coatings were prepared by mixing the following components:

| Composition Component | 3A | Control |
|---|---|---|
| | Parts by weight | |
| dehydrated castor oil alkyd[1] | 40.81 | 40.72 |
| phenolic resin[1] | 5.81 | 5.79 |
| propyleneglycolmonomethylether acetate[1] | 5.76 | 5.74 |
| methyl ethyl ketoxime[1] | 0.48 | 0.49 |
| dispersing agent[1] | 0.48 | 0.49 |
| magnesium silicate[1] | 39.33 | 40.71 |
| black tint[1] | 6.08 | 6.06 |

[1]As in Example 1(b).

and dispersing them to a particle size of 4½ and 5½ respectively, on a Hegman scale at a temperature of 133° F. Thereafter, 1.25 parts, by weight, of magnesium cyanamide was added to composition 2A. Composition 2A was then ground to a particle size of 8 on a Hegman scale at a temperature of 96° F.

Next, to each of the compositions was added 0.6133 milliliters of a blend of 21.03 grams of 12% cobalt catalyst, available under the trademark NuXtra ® from Tenneco, 42.07 grams of 9% manganese catalyst available under the trademark NuXtra ® from Tenneco and 42.09 grams of propyleneglycolmonomethylether acetate.

(b) The mirror back coatings of Example 3(a) were drawn down on the back surface of mirrored panels and exposed to infrared radiation at 250° F. A panel was prepared using coating 3A, one half of the panel having a dry film 1.0 mils the other half at a dry film thickness of 1.4 mils, respectively, and a panel was prepared using the control coating with the halves of the panel having dry film thicknesses of 1.0 and 1.5 mils, respectively. The panels were then evaluated for exposure to salt spray as described in Example 1. The results are shown in Table 3.

TABLE 3

| Test Coating | Sample 3A | 3A | Control | Control |
|---|---|---|---|---|
| Dry film thickness of coating (mils) | 1.0 | 1.4 | 1.0 | 1.5 |
| Salt Spray | | | | |
| black edge creep (mm) | 4.0 | 8.0 | 12.5 | 11.0 |
| density of spotting | none | very few | none | none |
| size of spots | — | small | — | — |

The panels coated with coatings of the invention provide improved protection for the thin metallic films as best illustrated by the reduced black edge creep of coatings 3A after the salt spray tests as compared to the control coating at both film thicknesses.

What is claimed is:

1. An article comprising a thin metallic film attached to a glass substrate and a layer of a hardened composition including an organic film-forming resin and a cyanamide salt of a non-lead metal applied to the thin metallic film wherein the composition inhibits degradation of the thin metallic films, the thin metallic film of a metal selected from the group consisting of silver and copper and having a thickness of up to about 1500 Angstroms.

2. The article of claim 1 wherein said metallic film comprises a silver layer adhering to a substrate and a copper layer adhering to said silver layer.

3. The article of claim 1 wherein the thin metallic film comprises a silver layer adhering to the glass substrate and a copper layer adhering to the silver layer.

4. The article of claim 1 wherein said cyanamide salt of a non-lead metal is the cyanamide salt of a Group IIA or IIB metal.

5. The article of claim 4 wherein said cyanamide salt is calcium cyanamide.

6. A process of inhibiting degradation of a thin metallic film comprising applying a composition including an organic film forming resin and a cyanamide salt of a non-lead metal to the thin metallic film, said thin metallic film of a metal selected from the group consisting of silver and copper and having a thickness of up to about 1500 Angstroms, whereby the applied composition inhibits degradation of the thin metallic film as compared to a thin metallic film coated with the organic film forming resin of the composition without the cyanamide salt of a non-lead metal.

7. The process of claim 6 wherein said thin metallic film is attached to a glass surface.

8. The process of claim 6 wherein said cyanamide salt of a non-lead metal is the cyanamide salt of a Group IIA or IIB metal.

9. The process of claim 8 wherein said cyanamide salt is calcium cyanamide.

* * * * *